United States Patent
Kidd et al.

(10) Patent No.: US 12,481,312 B2
(45) Date of Patent: Nov. 25, 2025

(54) FRONT PORT DONGLE FOR A SERVER TYPE INFORMATION HANDLING SYSTEM

(71) Applicant: Dell Products L.P., Round Rock, TX (US)

(72) Inventors: Owen Kidd, Cedar Park, TX (US); Walter R. Carver, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 257 days.

(21) Appl. No.: 18/138,045

(22) Filed: Apr. 22, 2023

(65) Prior Publication Data
US 2024/0353893 A1    Oct. 24, 2024

(51) Int. Cl.
*G06F 1/16* (2006.01)

(52) U.S. Cl.
CPC ...................... *G06F 1/16* (2013.01)

(58) Field of Classification Search
CPC .................... G06F 1/16; H05K 7/00
See application file for complete search history.

(56) References Cited

U.S. PATENT DOCUMENTS

| 4,878,848 A * | 11/1989 | Ingalsbe | H01R 31/06 439/76.1 |
| 2009/0153002 A1* | 6/2009 | Kinoshita | B60R 11/0205 312/223.1 |
| 2022/0330419 A1* | 10/2022 | Karuppiah | H04L 49/40 |

* cited by examiner

*Primary Examiner* — Imani N Hayman
*Assistant Examiner* — Rashen E Morrison
(74) *Attorney, Agent, or Firm* — Terrile, Cannatti & Chambers, LLP; Stephen A. Terrile

(57) ABSTRACT

A front port dongle component for a server type information handling system. The front port dongle component includes a housing, the housing including an insertion portion and a front portion, the insertion portion being configured to fit within a void defined by the server type information handling system, the front portion being configured to protrude beyond a front bezel of the server type information handling system; a server side connector, the server side connector interfacing with at least one of a plurality of connection features; and, a plurality of connectors mounted on the front portion of the housing, the plurality of connectors being coupled to the server side connector and providing separate connections for at least two functions from the at least one of the plurality of connection features.

10 Claims, 14 Drawing Sheets

FRONT PORT DONGLE FOR A SERVER TYPE INFORMATION HANDLING SYSTEM

BACKGROUND OF THE INVENTION

Field of the Invention

The present invention relates to information handling systems. More specifically, embodiments of the invention relate to server type information handling systems within information technology (IT) environments.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

It is known to use information handling systems and related IT systems within information technology (IT) environments such as data centers.

SUMMARY OF THE INVENTION

A system and method for providing a front port secured dongle which clips onto the faceplate of the server, separates two or more features, and guards the server mounting slam latch to prevent accidental server removal in a blind-mate powered scenario.

In one embodiment, the invention relates to a front port dongle component for a server type information handling system, comprising: a housing, the housing including an insertion portion and a front portion, the insertion portion being configured to fit within a void defined by the server type information handling system, the front portion being configured to protrude beyond a front bezel of the server type information handling system; a server side connector, the server side connector interfacing with at least one of a plurality of connection features; and, a plurality of connectors mounted on the front portion of the housing, the plurality of connectors being coupled to the server side connector and providing separate connections for at least two functions from the at least one of the plurality of connection features.

In another embodiment, the invention relates to a system comprising: a processor; a data bus coupled to the processor; and, a front port dongle component, the front port dongle component comprising a housing, the housing including an insertion portion and a front portion, the insertion portion being configured to fit within a void defined by the server type information handling system, the front portion being configured to protrude beyond a front bezel of the server type information handling system; a server side connector, the server side connector interfacing with at least one of a plurality of connection features; and, a plurality of connectors mounted on the front portion of the housing, the plurality of connectors being coupled to the server side connector and providing separate connections for at least two functions from the at least one of the plurality of connection features.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
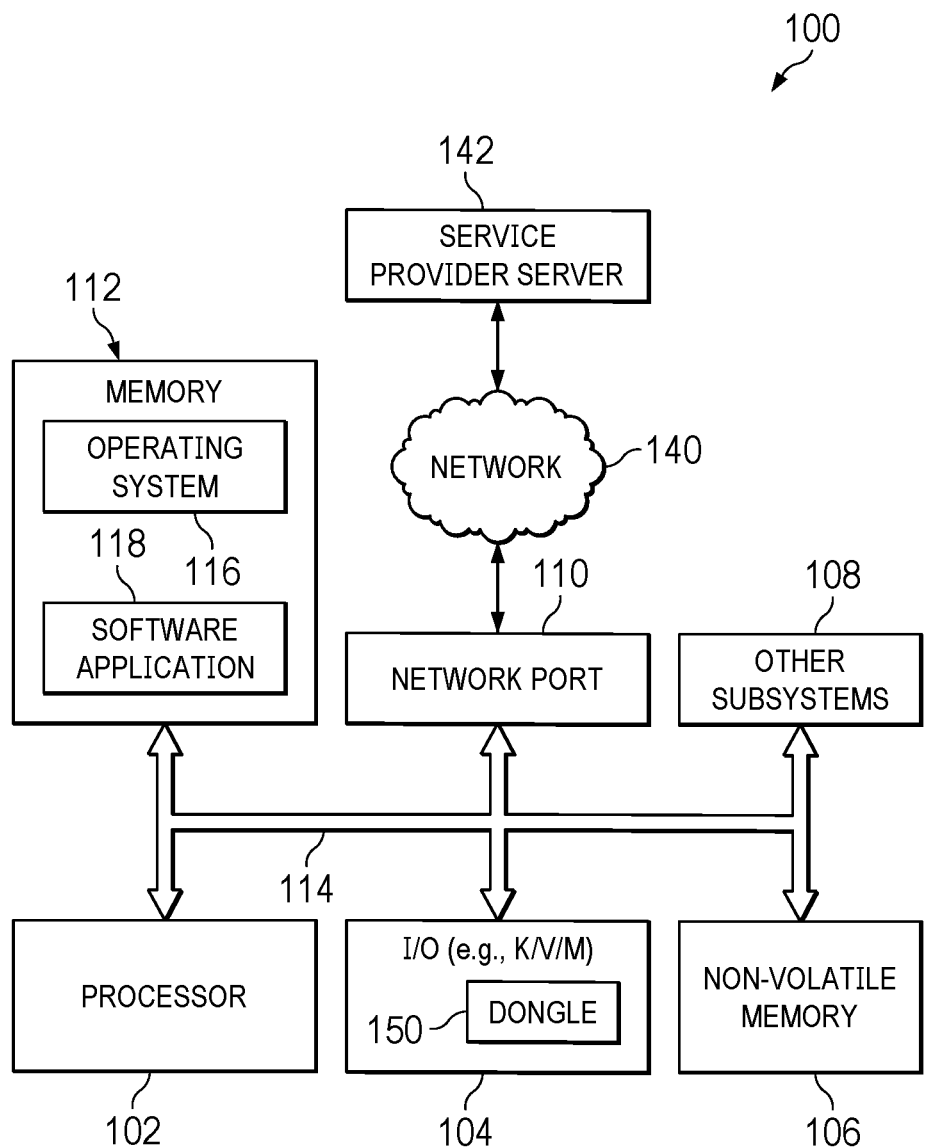
FIG. 1 shows a general illustration of components of an information handling system as implemented in the system and method of the present invention.

Various aspects of the disclosure include an appreciation that many features contend for faceplate space especially in server type information handling systems. Various aspects of the disclosure include an appreciation that these features can include one or more of storage features, Input/output (I/O) device features, user interface (UI) features, airflow features and power supply features. Various aspects of the disclosure include an appreciation that often the available faceplate space is not sufficient for the coexistence of all desired feature use cases.

Various aspects of the disclosure include an appreciation that after tradeoffs have been made and some potentially desired features have been dropped, remaining features are often combined (e.g., a shared network interface card (NIC)) or moved outside of the rack server envelope (e.g., into the server ears) to coexist in the same system while avoiding physical conflicts with other facets of the rack server. In the case of combined features, designers can choose to combine two or more features together into a high speed bus technology (such as USB-C) or into proprietary pinned connectors. Various aspects of the disclosure include an appreciation that to separate these combined features, users of these features may use a proprietary or off-the-shelf dongle to separate/translate the signals from the high speed bus or proprietary pinned connector.

A system and method are disclosed for providing a front port secured dongle which clips onto the faceplate of the server, separates two or more features, and guards the server mounting slam latch to prevent accidental server removal in a blind-mate powered scenario. In certain embodiments, the front port secured dongle separates two or more functions (e.g., universal serial bus (USB) connections, video connections and local area network (LAN) connections) from one or both of a high speed bus or a proprietary pinned connector. In certain embodiments, the front port secured dongle is cubic in shape and includes clipping attachment features as well as one or both a high speed bus connector and a proprietary pinned connector interface on the server-facing side of the dongle. In certain embodiments, the front port secured dongle is designed with a recess on the rear to seat in part over a server ear latch. In certain embodiments, the front port secured dongle does not protrude further from the server faceplate than a typical server bezel. In certain embodiments, the front port secured dongle includes latching features to be used to interface with a bezel that has an appropriate cutout to accept the dimensions of the dongle. In certain embodiments, the front port secured dongle includes one or more pass-through button or light-pipe features to reveal other server faceplate functions masked by the dongle. In certain embodiments, the front port secured dongle is colored in a way to alert a user to the blind-mate nature of the server's power, signal, or cooling source. Such a front port secured dongle is designed to be integrated in attachment to the server faceplate and to prevent accidental server removal in a blind-mate server scenario.

FIG. 1 shows a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116. In certain embodiments, the information handling system 100 is one of a plurality of information handling systems within a data center. In certain embodiments, the information handling system 100 comprises a server type information handling system. In certain embodiments, the server type information handling system is configured to be mounted within a server rack. In certain embodiments, the other subsystem 108 includes one or more power supplies for supplying power to the other components of the information handling system 100.

In certain embodiments, the information handling system 100 comprises a server type information handling system. In certain embodiments, the server type information handling system comprises a rack server type information handling system. As used herein, a rack server type information handling system broadly refers to an information handling system which is physically configured to be mounted within a server rack.

In certain embodiments, the information handling system 100 includes a dongle component 150. In certain embodiments, the dongle component 150 includes a front port secured dongle which clips onto the faceplate of the server, separates two or more features, and guards the server mounting slam latch to prevent accidental server removal in a blind-mate powered scenario. In certain embodiments, the front port secured dongle 150 separates two or more functions (e.g., universal serial bus (USB) connections, video connections and local area network (LAN) connections) from one or both of a high speed bus or a proprietary pinned connector. In certain embodiments, the front port secured dongle 150 is cubic in shape and includes clipping attachment features as well as one or both a high speed bus connector and a proprietary pinned connector interface on the server-facing side of the dongle. In certain embodiments, the front port secured dongle 150 is designed with a recess on the rear to seat in part over a server ear latch. In certain embodiments, the front port secured dongle 150 does not protrude further from the server faceplate than a typical server bezel. In certain embodiments, the front port secured dongle 150 includes latching features to be used to interface with a bezel that has an appropriate cutout to accept the dimensions of the dongle. In certain embodiments, the front port secured dongle 150 includes one or more pass-through button or light-pipe features to reveal other server faceplate functions masked by the dongle. In certain embodiments, the front port secured dongle is colored in a way to alert a user to the blind-mate nature of the server's power, signal, or cooling source. Such a front port secured dongle 150 is designed to be integrated in attachment to the server faceplate and to prevent accidental server removal in a blind-mate server scenario.

Figure 2:
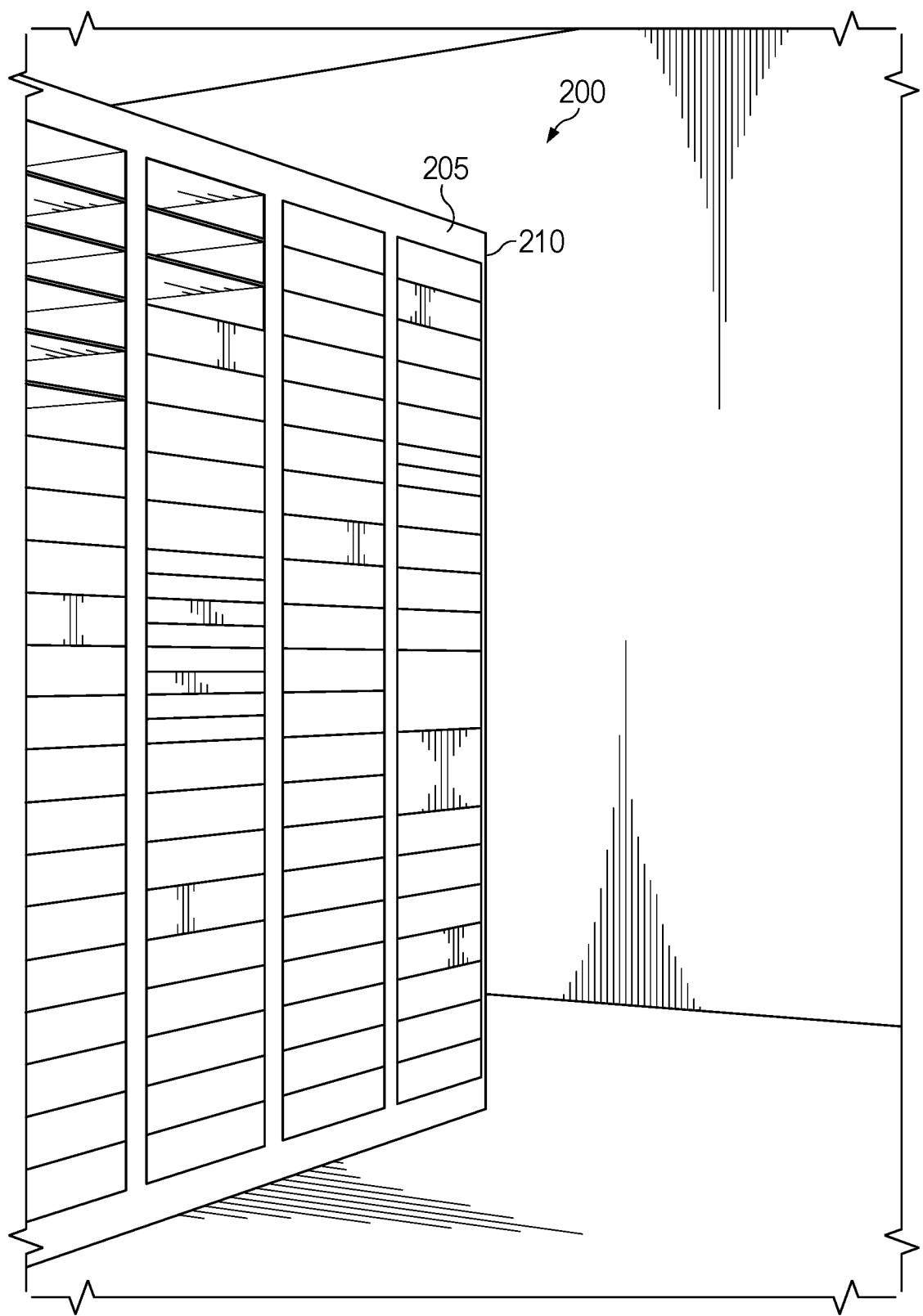
FIG. 2 shows a perspective view of a portion of a data center within an IT environment.

FIG. 2 shows a perspective view of a portion of an IT environment 200. The IT environment includes one or more racks 205 which include a plurality of information handling systems 100, often referred to as a server rack. In various embodiments, the IT environment 200 comprises a data center. As used herein, a data center refers to an IT environment which includes a plurality of networked information handling systems 100. In various embodiments, the information handling systems 100 of the data center include some or all of router type information handling systems, switch type information handling systems, firewall type information handling systems, storage system type information handling systems, server type information handling systems and application delivery controller type information handling systems. In certain environments, the information handling systems 100 are mounted within respective racks. As used herein, a rack refers to a physical structure that is designed to house the information handling systems 100 as well as the associated cabling and power provision for the information handling systems. In certain embodiments, a rack includes side panels to which the information handling systems are mounted. In certain embodiments, the rack includes a top panel and a bottom panel to which the side panels are attached. In certain embodiments, the side panels each include a front side panel and a rear side panel.

In certain embodiments, a plurality of racks is arranged continuous with each other to provide a rack system. An IT environment can include a plurality of rack systems arranged in rows with aisles via which IT service personnel can access information handling systems mounted in the racks. In certain embodiments, the aisles can include front aisles via which the front of the information handling systems may be accessed and hot aisles via which the infrastructure (e.g., data and power cabling) of the IT environment can be accessed.

Each respective rack includes a plurality of vertically arranged information handling systems 210. In certain embodiments, the information handling systems may conform to one of a plurality of standard server sizes. In certain embodiments, the plurality of server sizes conforms to particular rack unit sizes (i.e., rack units). As used herein, a rack unit broadly refers to a standardized server system height. As is known in the art, a server system height often conforms to one of a 1U rack unit, a 2U rack unit and a 4U rack unit. In general, a 1U rack unit is substantially (i.e., +/−20%) 1.75" high, a 2U rack unit is substantially (i.e., +/−20%) 3.5" high and a 4U rack height is substantially (i.e., +/−20%) 7.0" high.

Figure 3A:
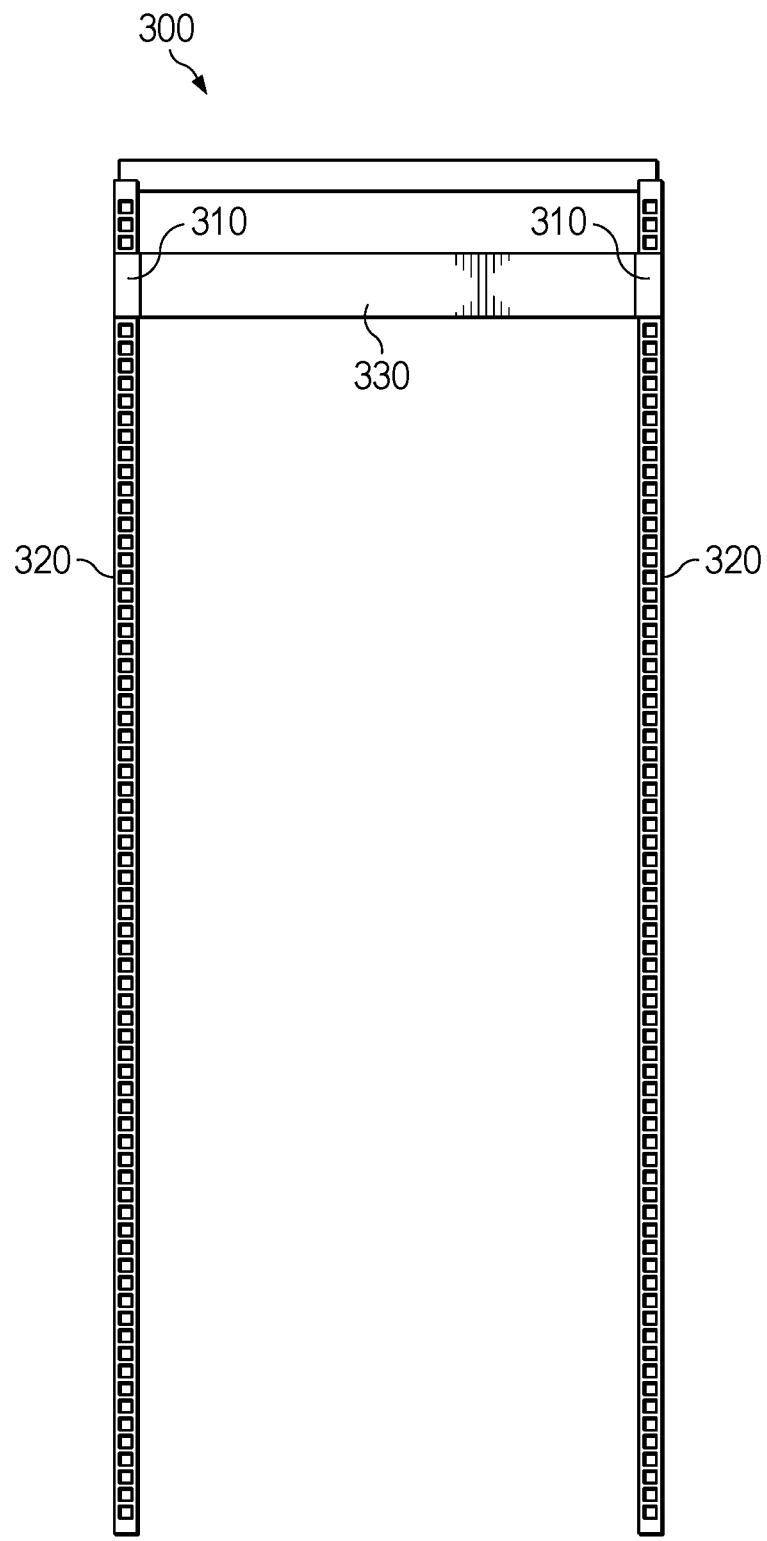
FIGS. 3A, 3B and 3C show a rack front view, a rack side view, and a rack side view with an information handling system in an accessible position.
Figure 3C:
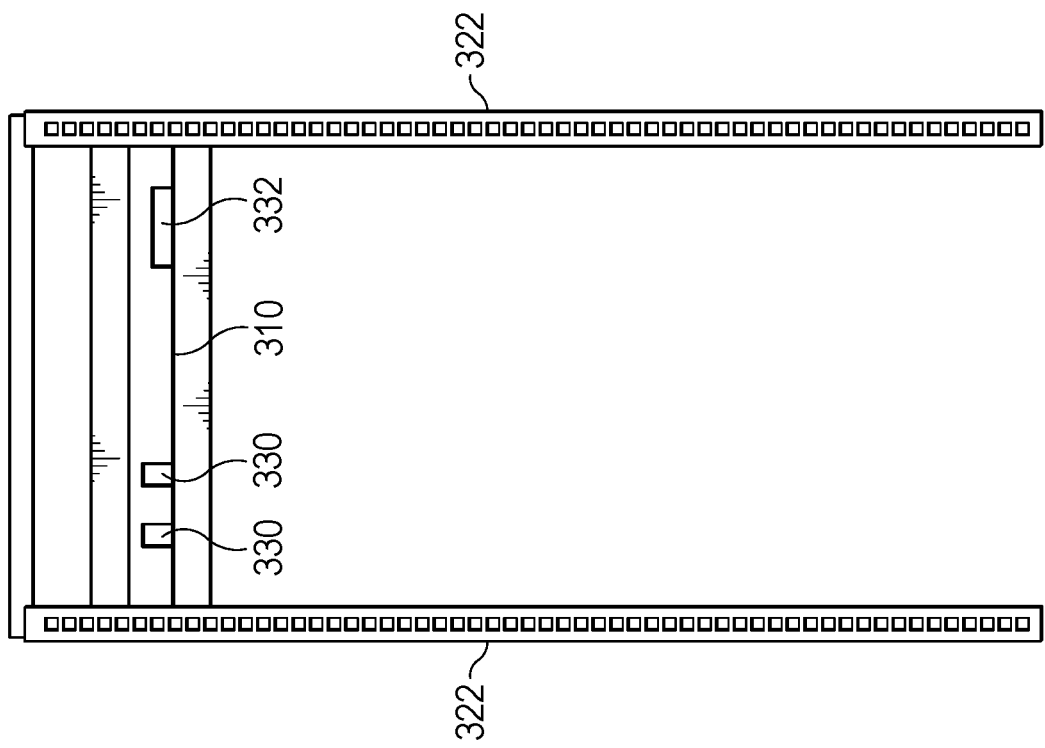
Figure 3B:
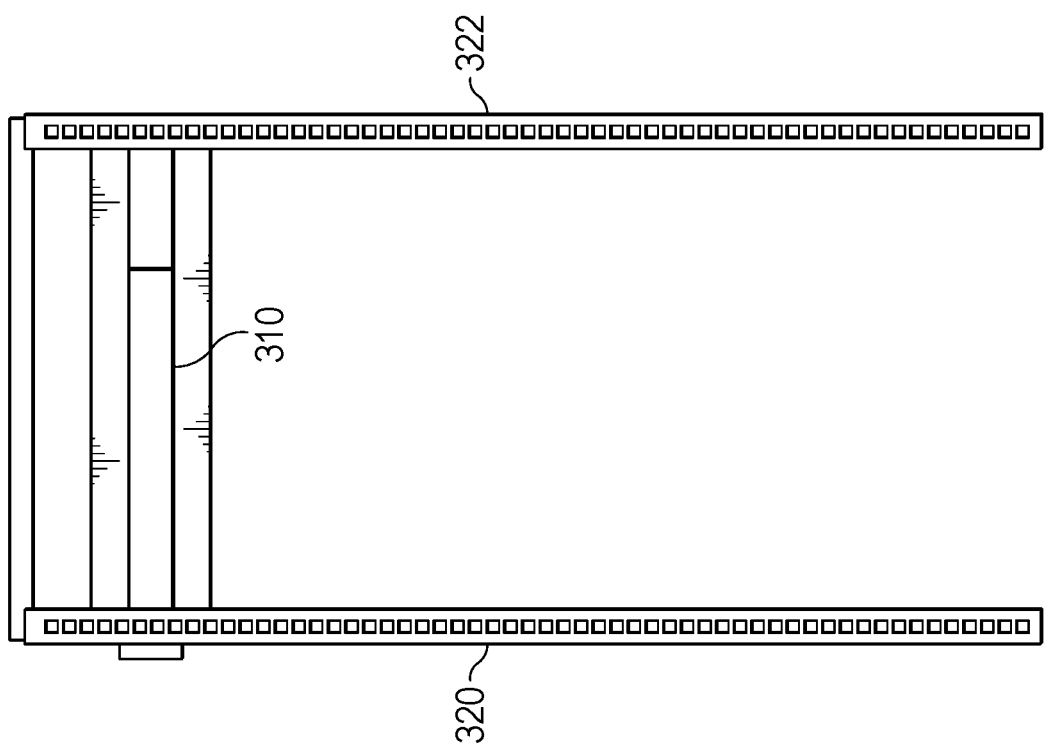

FIGS. 3A, 3B and 3C show a rack front view, a rack side view, and a rack rear view with an information handling system. A first server mounting component 310 is attached to one side of the rack and a second server mounting component 310 is attached to another side of the rack 410. In certain embodiments, the first server mounting component is attached to a first front side panel 320 and a first rear side panel 322 of the rack 300. In certain embodiments, the second server mounting component is attached to a second front side panel 320 and a second rear side panel 322 of the rack 300. In certain embodiments, the first server mounting component 320 is attached via the mounting apertures 330. In certain embodiments, the second server mounting component is attached via the mounting apertures 330.

In certain embodiments, a rack includes a plurality of vertically arranged mounting components. In certain embodiments, some or all of the vertically arranged mounting components are adapted to mount respective rack server type information handling systems to the rack. In certain embodiments, the server mounting components are configured to correspond to particular rack unit heights. In certain embodiments, the server rack includes a blind mate power connector and the power source is included within the blind mate power connector.

Figure 4:
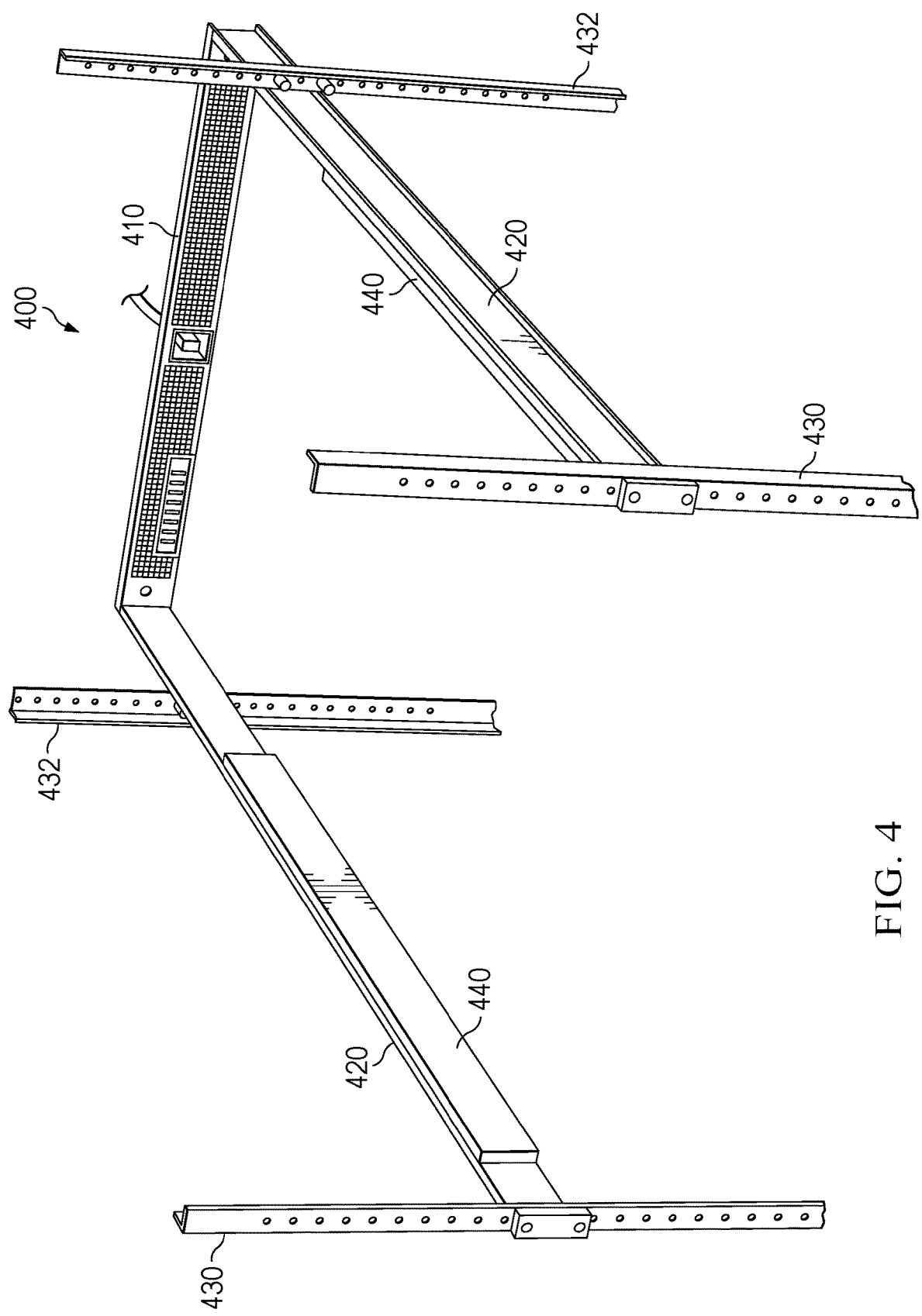
FIG. 4 shows a perspective view of server mounting components attached to a rack.

FIG. 4 shows a perspective view of server mounting components 400 attached to a rack. In certain embodiments, the server mounting components 400 include a server-side blind-mate adapter 410. In certain embodiments, a first server mounting component 420 is attached to one side of the rack and a second server mounting component 420 is attached to another side of the rack 410. In certain embodiments, the first server mounting component is attached to a first front side panel 430 and a first rear side panel 432 of the rack. In certain embodiments, the second server mounting component is attached to a second front side panel 430 and a second rear side panel 432 of the rack. In certain embodiments, the first server mounting component 420 is coupled to one edge of the server-side blind mate adapter 410. In certain embodiments, the second server mounting component 420 is coupled to another edge of the server-side blind mate adapter 410. In certain embodiments, the server mounting components 400 include one or more mechanical guiding features 440 mechanically coupled to respective server mounting components 420.

Figure 5:
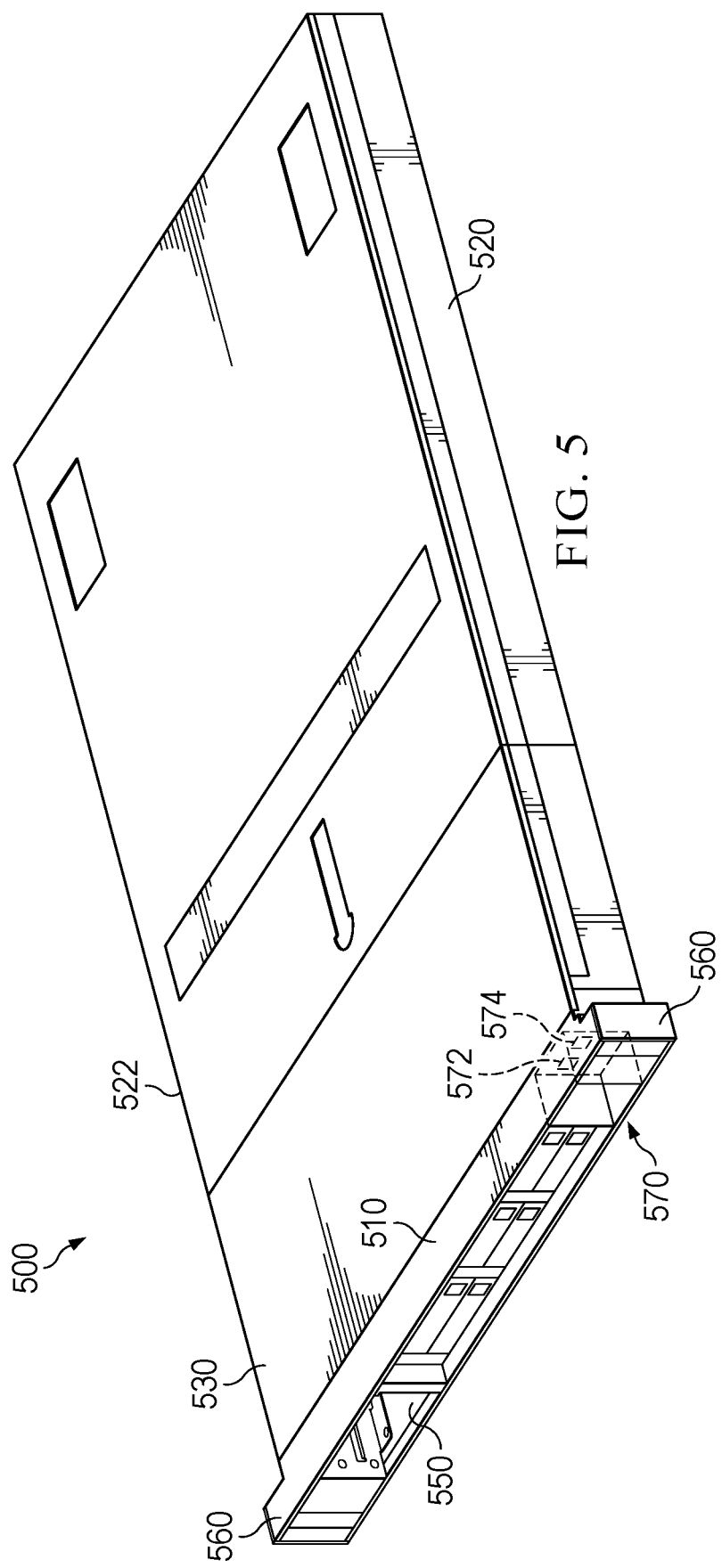
FIG. 5 shows a generalized perspective view of an example rack server type information handling system.

FIG. 5 shows a generalized perspective view of an example rack server type information handling system 500. In certain embodiments, the rack server type information handling system includes a front portion 510, which is accessible when the rack server type information handling system 500 is mounted on a server rack. In certain embodiments, the side portions 520, 522 mount to the rack via respective server mounting components. In certain embodiments, the side portions mount to the rack via respective mechanical guiding features which are mechanically coupled to respective server mounting components. In certain embodiments, the rack server type information handling system can slide out from the rack via the respective mechanical guiding features. In certain embodiments, internal components of the rack type information handling system 500 may be accessed by removing a top panel 530 of the rack type information handing system 500. In certain embodiments, the rack type information handing system 500 includes a bay 550 via which components may be mounted to the rack type information handling system.

In certain embodiments, the rack type information handling system 500 includes a plurality of mounting wings 560 which securely connect the rack type information handling system with a rack. In certain embodiments, the rack type information handling system 500 defines a void 570 positioned contiguously with one of the mounting wings 560. In certain embodiments, the rear of the void includes at least one of a plurality of connection features 572, 574. In certain embodiments the plurality of connection features includes one or both of a high speed bus connection feature and a proprietary pinned connection feature.

Figure 6A:
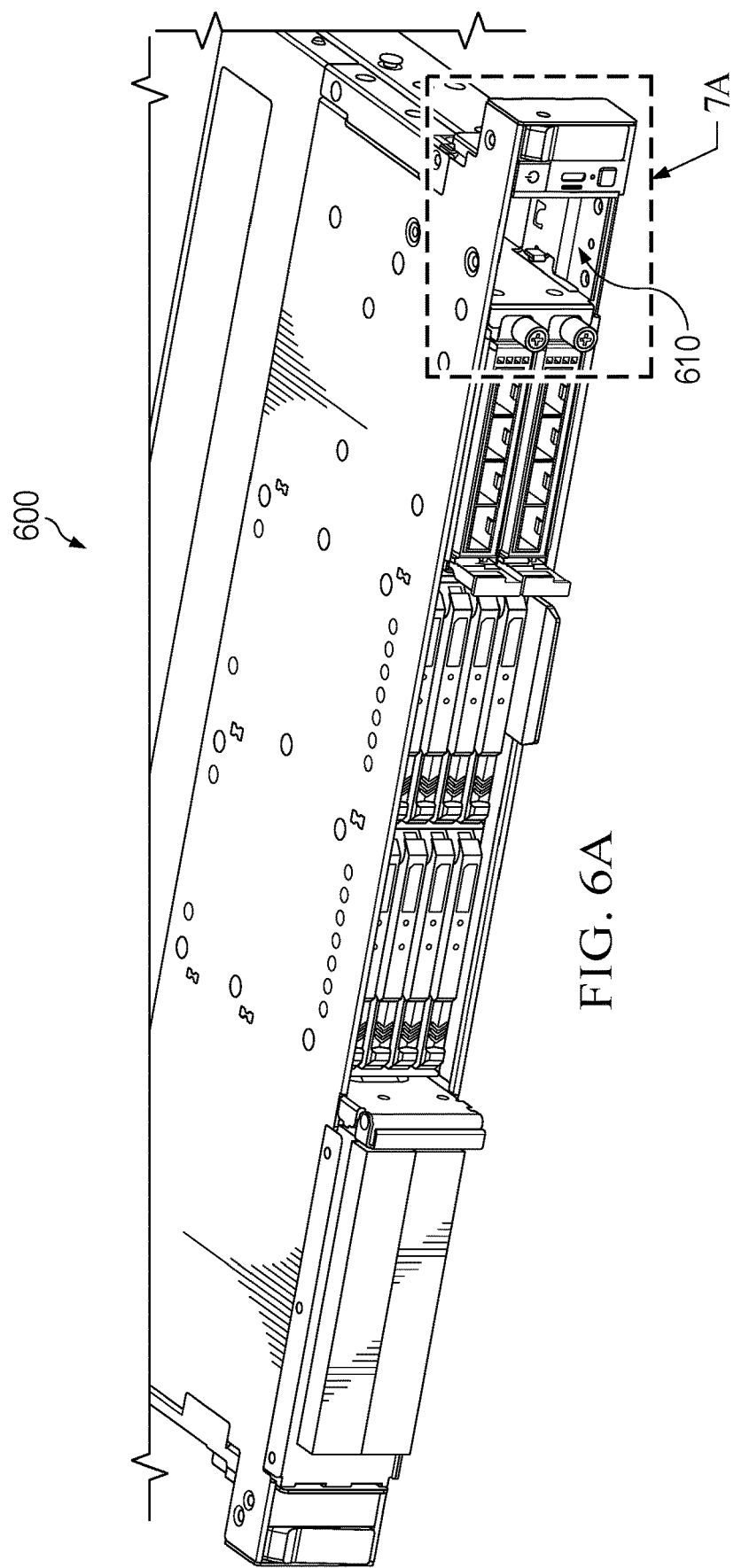
FIGS. 6A, 6B and 6C, generally referred to as FIG. 6, show perspective views of a front portion of a rack server type information handling system.
Figure 6B:
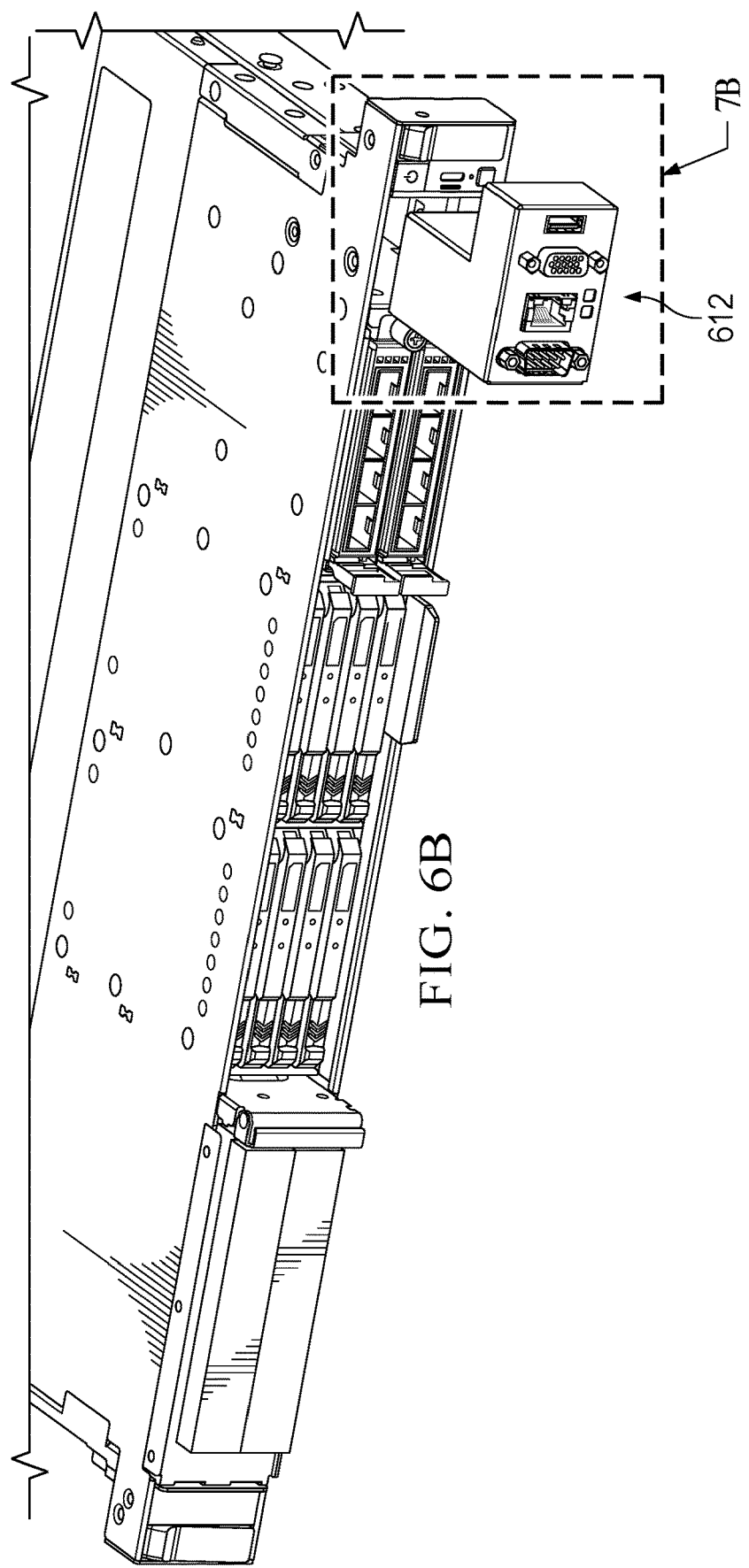
Figure 6C:
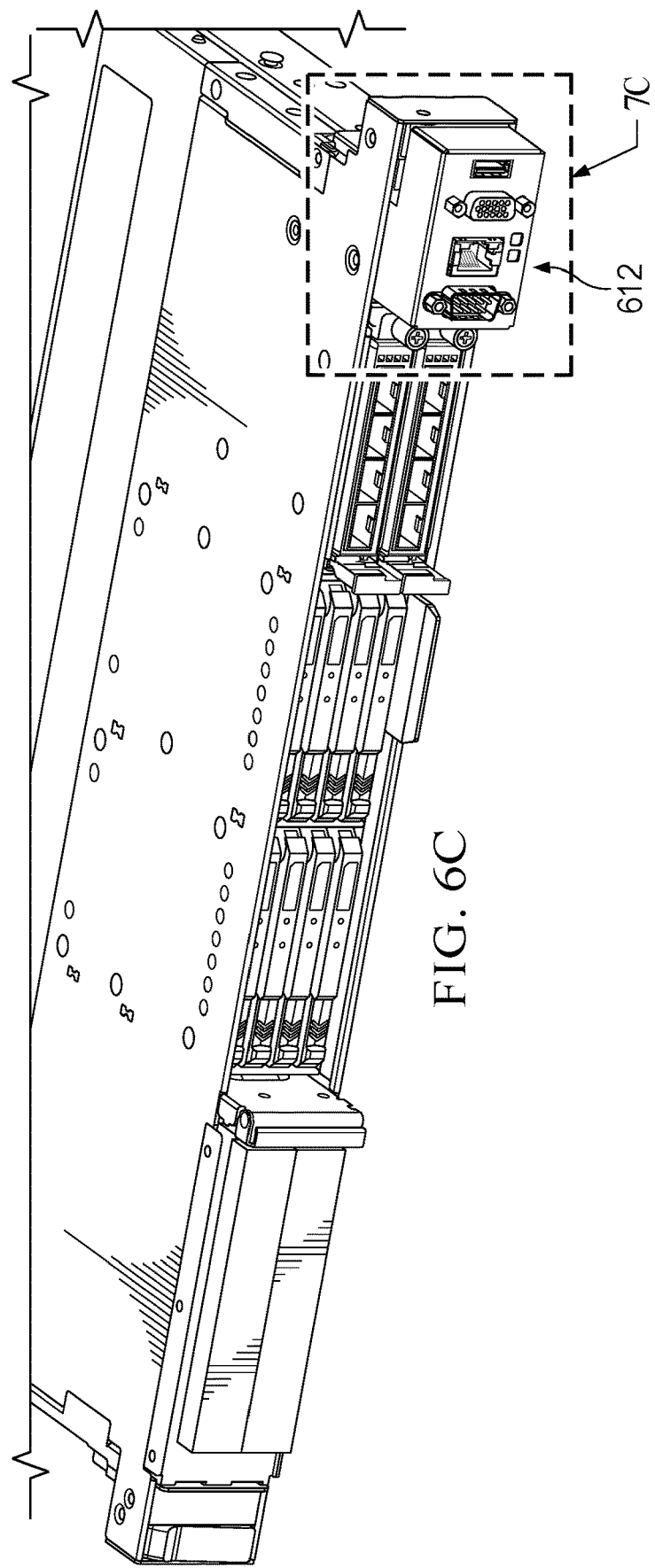
Figure 7A:
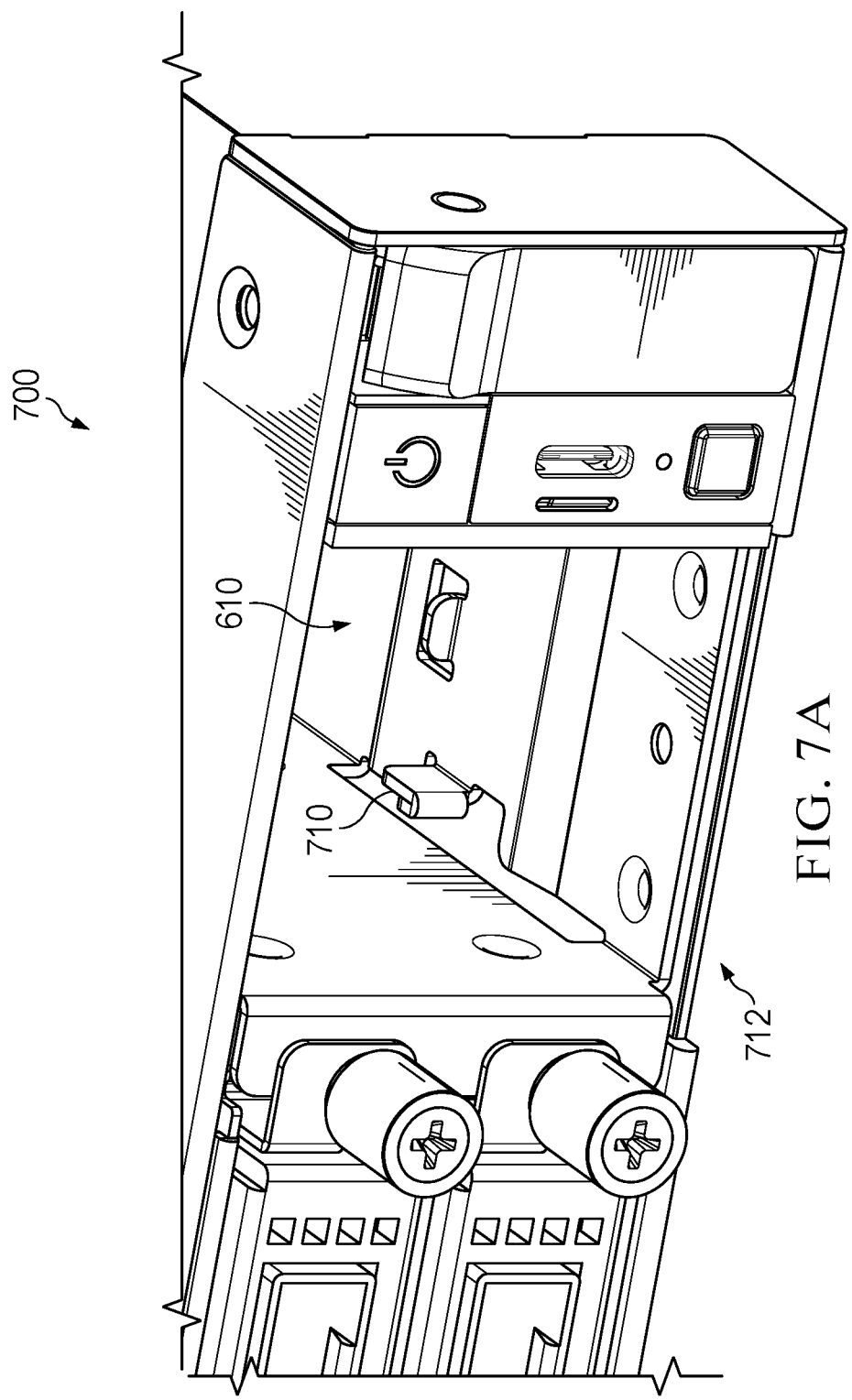
FIGS. 7A, 7B and 7C, generally referred to as FIG. 7, show perspective views of a front portion of a rack server type information handling system.
Figure 7B:
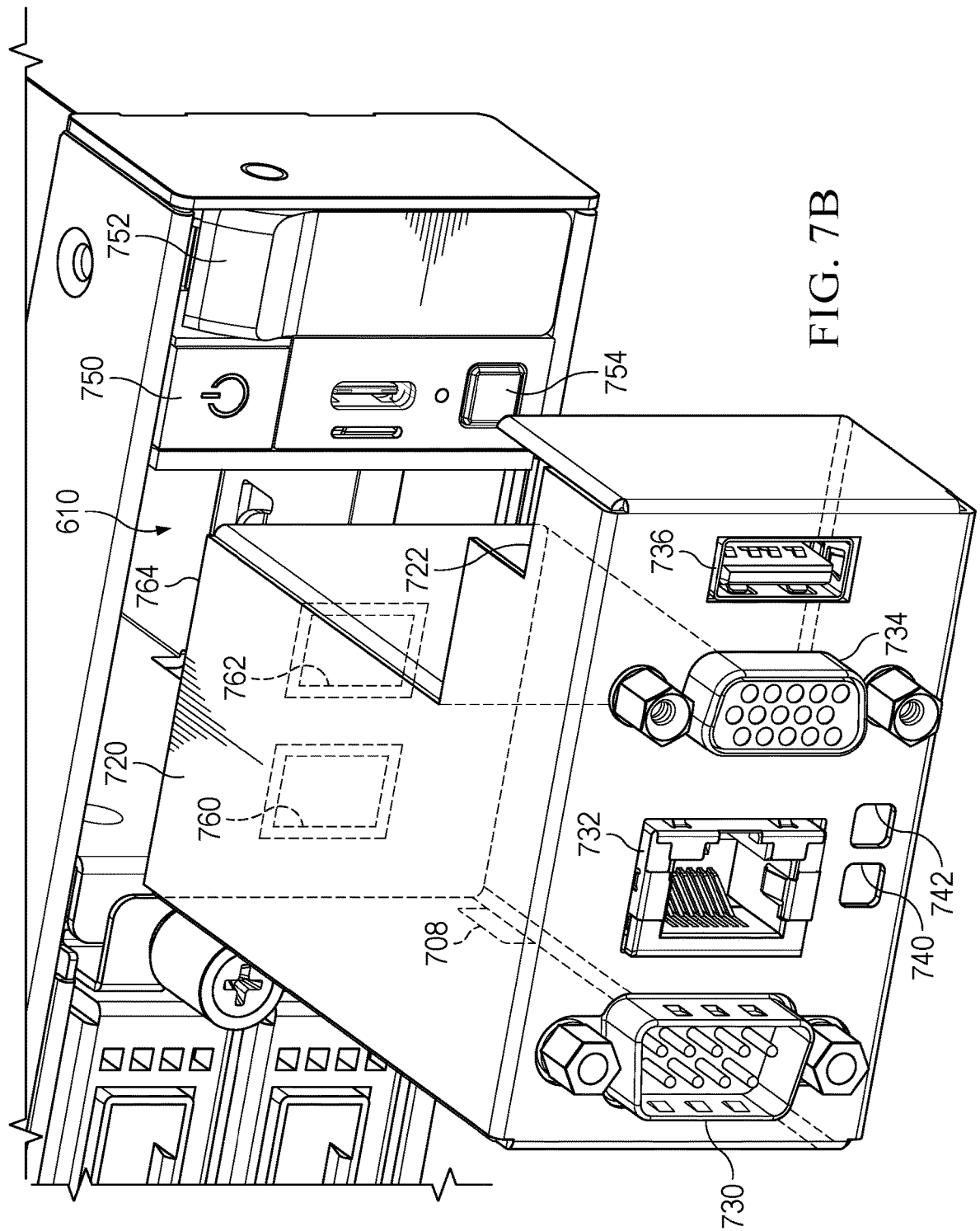
Figure 7C:
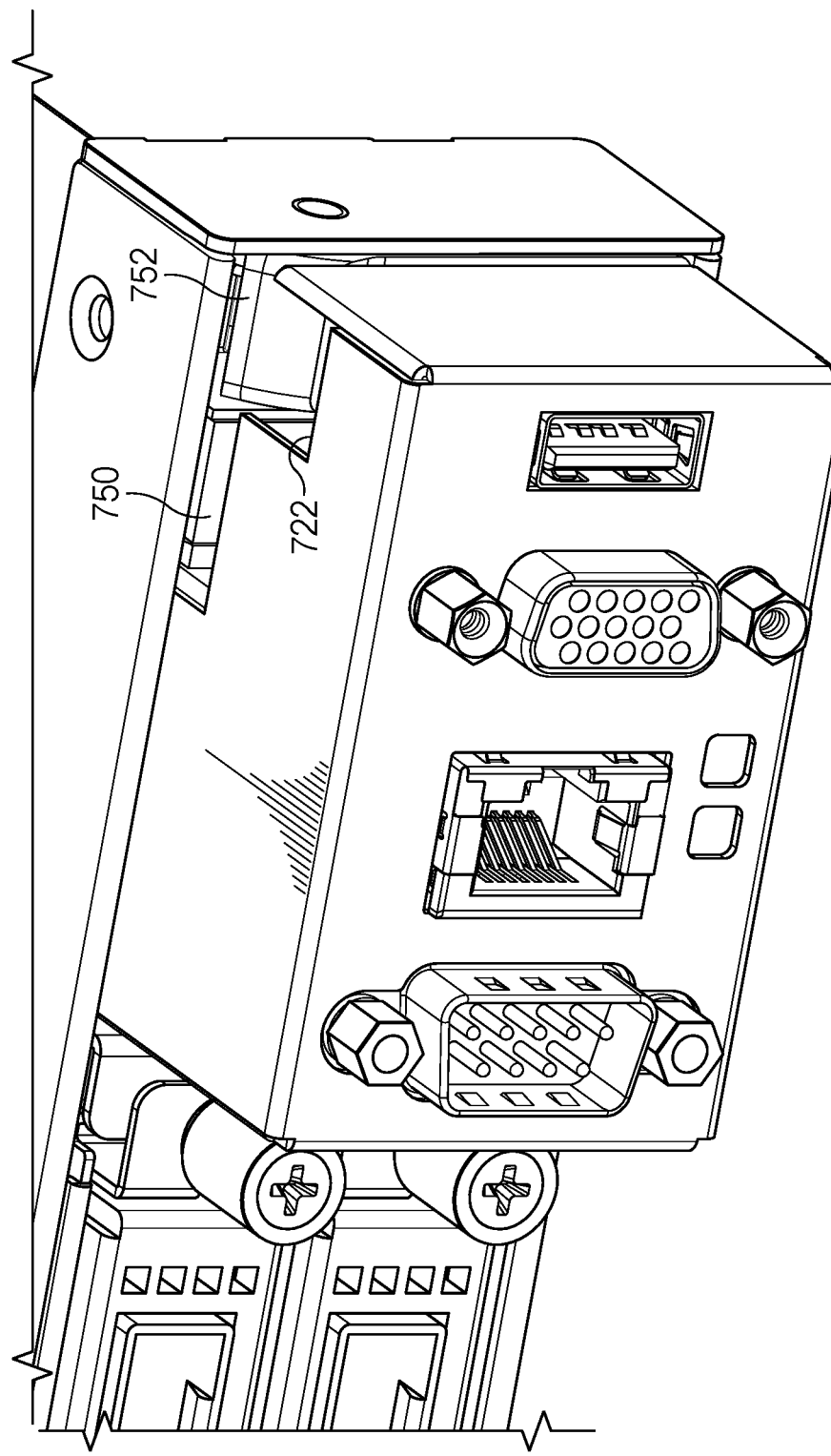
Figure 7D:
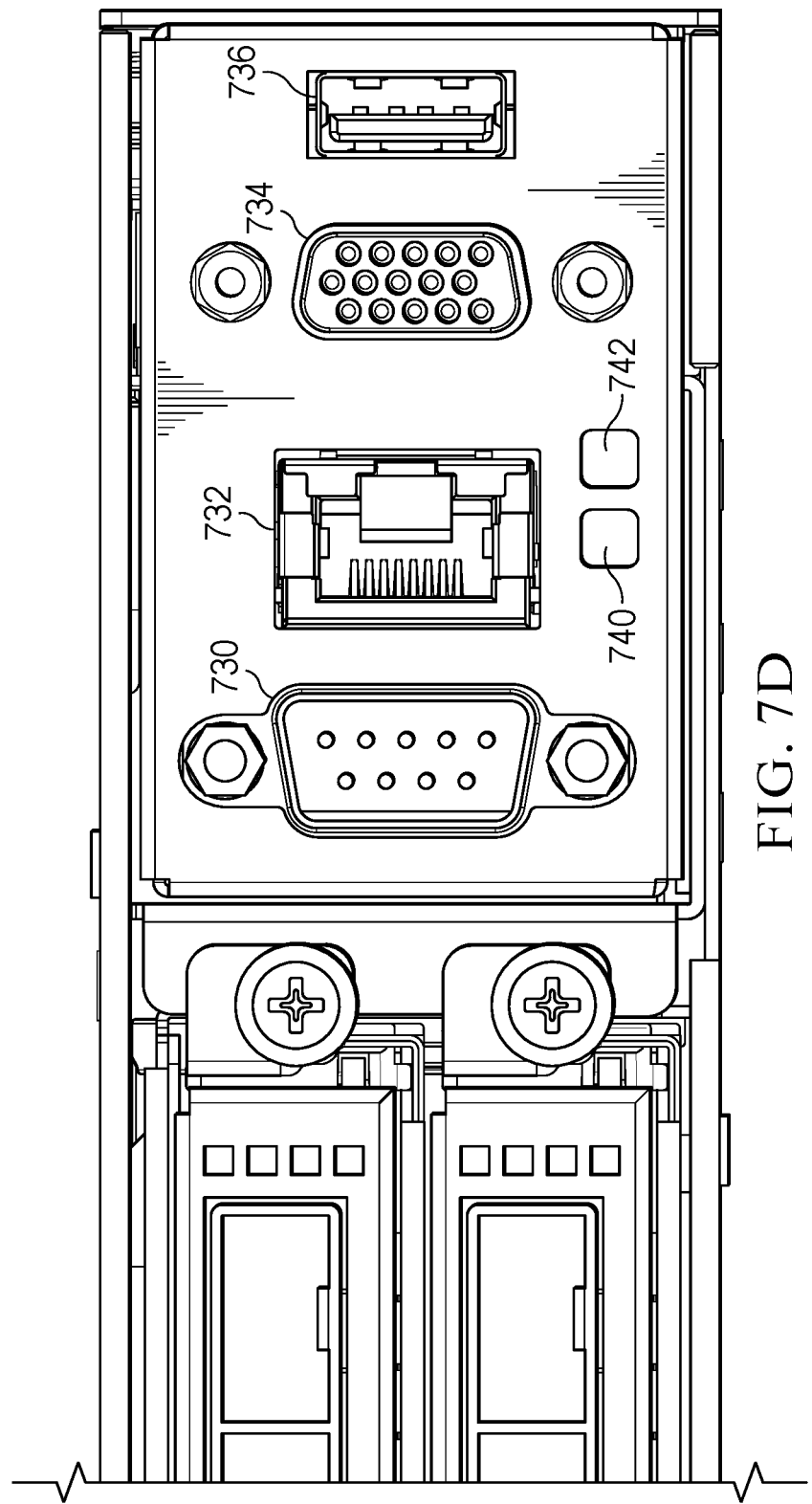
FIG. 7D, generally referred to as FIG. 7, shows a front view of a front portion of a rack server type information handling system.
Figure 7E:
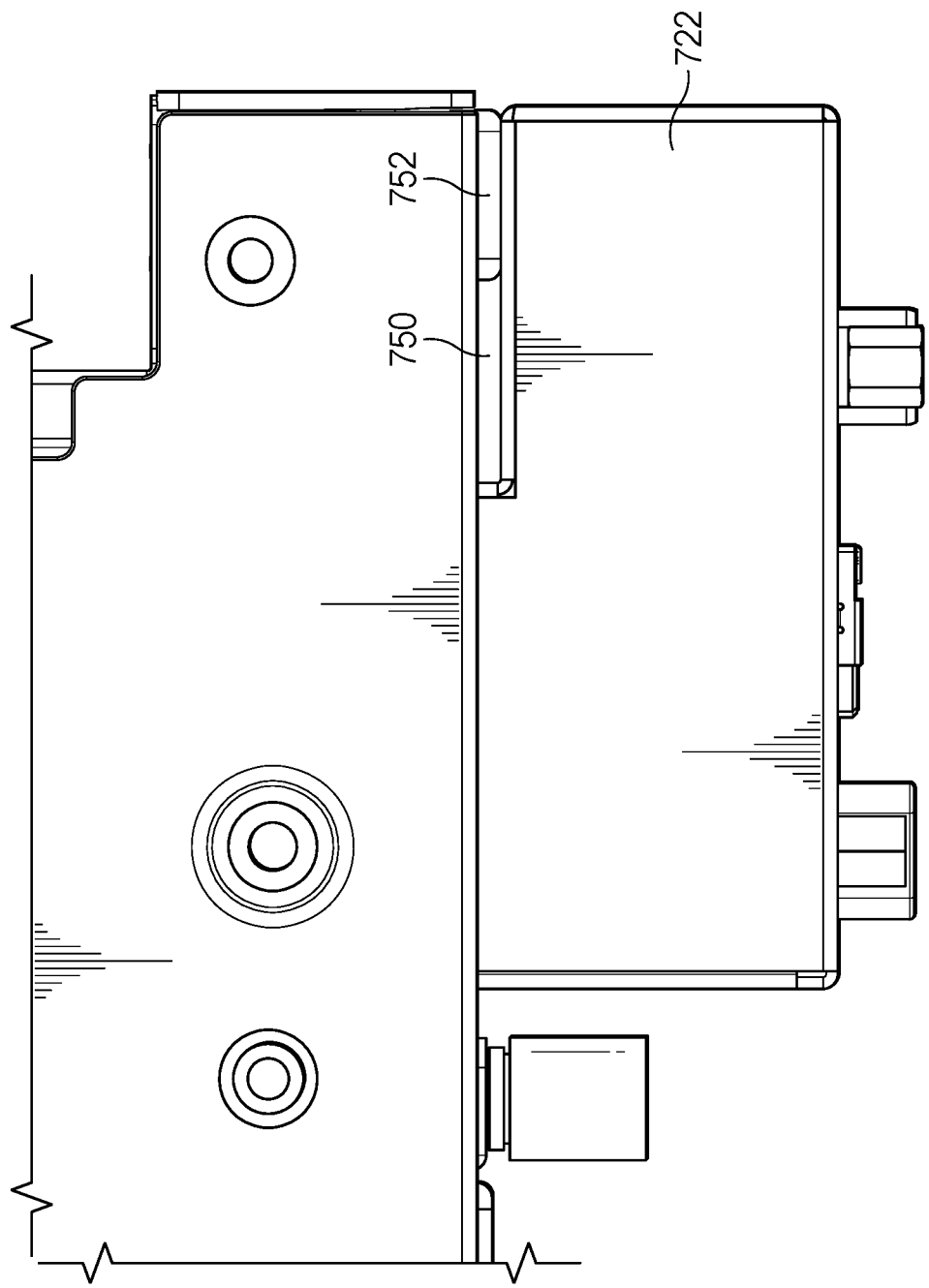
FIG. 7E, generally referred to as FIG. 7, shows a top view of a front portion of a rack server type information handling system.

FIGS. 6A, 6B and 6C, generally referred to as FIG. 6, show perspective views of a front portion of a rack server type information handling system 600. FIGS. 7A, 7B and 7C, generally referred to as FIG. 7, show perspective views of a front portion of a rack server type information handling system. FIG. 7D, generally referred to as FIG. 7, shows a front view of a front portion of a rack server type information handling system. FIG. 7E, generally referred to as FIG. 7, shows a top view of a front portion of a rack server type information handling system.

In certain embodiments, the information handling system 600 defines a void 750 into which a dongle component 612 may be installed. In certain embodiments, the dongle component 612 includes a front port secured dongle which clips onto the faceplate of the server, separates two or more features, and guards the server mounting slam latch to prevent accidental server removal in a blind-mate powered scenario. In certain embodiments, the front port secured dongle 612 separates two or more functions (e.g., universal serial bus (USB) connections, video connections, local area network (LAN) connections and serial port connections) from one or both of a high speed bus or a proprietary pinned connector. In certain embodiments, the front port secured dongle 612 is cubic in shape and includes clipping attachment feature 708, 710 as well as one or both of a server-side high speed bus connector and a server-side proprietary pinned connector interface on the server-facing side of the dongle 612. In certain embodiments, the server-side connectors are mounted on a rear wall of the front port secured dongle 612.

In certain embodiments, the front port secured dongle 612 is designed with a recess 722 on the rear to seat in part over a server ear latch 752. In certain embodiments, the front port secured dongle 612 includes a substantially L-shaped housing. In certain embodiments, the L-shaped housing includes an insertion portion 720 which fits within the void 610 defined by the server and a front portion 722 which protrudes beyond a front bezel of the server. In certain embodiments, the front port secured dongle 612 does not protrude further from the server faceplate more than a typical server bezel (see e.g., FIG. 7E). In certain embodiments, a front portion of the front port secured dongle 612 includes a plurality of connectors. In certain embodiments, the plurality of connectors are coupled to the server side connector and provide separate connections for at least two functions from the plurality of connection features. In various embodiments, the plurality of connectors include one or more of a serial port connector 730, a local area network (LAN) connector 732, a video connector 734 and a universal serial bus (USB) connector 736 to provide separate connections for a serial port feature, a local area network feature, a video feature and a universal serial bus feature.

In certain embodiments, the front port secured dongle 612 includes latching features to be used to interface with a bezel that has an appropriate cutout 712 to accept the dimensions of the dongle. In certain embodiments, the front port secured dongle 612 includes one or more pass-through features 740, 742 such as a pass-through button or light-pipe feature. In certain embodiments, the one or more pass-through features 740, 742 reveal other server faceplate functions masked by the dongle such as a power button function 750 and a server status function 754. In certain embodiments, the front port secured dongle is colored in a way to alert a user to the blind-mate nature of the server's power, signal, or cooling source. In certain embodiments, a portion of the front portion 722 of the L-shaped dongle is configured to cover power 750 and ear slam latch 752 functions of the information handling system 700. Such a front port secured dongle 612 is designed to be integrated in attachment to the server faceplate and to prevent accidental server removal in a blind-mate server scenario.

In certain embodiments, the front port secured dongle 612 includes one or more server-side connectors 760, 762 mounted on a server-facing side of the dongle 612. In certain embodiments, the one or more server side connectors include at least one of a server-side high speed bus connector and a server-side proprietary pinned connector interface. In certain embodiments, the server-side connectors 760, 762 are mounted on a rear wall 764 of the front port secured dongle 612.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A front port dongle component for a server type information handling system, comprising:
   a housing, the housing including an insertion portion and a front portion, the insertion portion being configured to removably fit within a void defined by the server type information handling system, the front portion being configured to protrude beyond a front bezel of the server type information handling system;
   a server side connector, the server side connector interfacing with at least one of a plurality of connection features; and,
   a plurality of connectors mounted on a front face of the front portion of the housing, the plurality of connectors being coupled to the server side connector and providing separate connections for at least two functions from the at least one of the plurality of connection features; and wherein
   the server type information handling system comprises a rack server type information handling system;
   the rack server type information handling system comprises a mounting wing; and,
   the front portion of the housing covers the mounting wing when the front port dongle component is mounted within the void.

2. The front port dongle component of claim 1, wherein:
   the housing is L-shaped.

3. The front port dongle component of claim 1, wherein:
   the plurality of connection features comprise one or both of a high speed bus connection and a proprietary pinned connection.

4. The front port dongle component of claim 1, wherein:
   the plurality of connectors include at least two of a serial port connector, a local area network connector, a video connector and a universal serial bus connector.

5. The front port dongle component of claim 1, further comprising:
   a pass-through feature, the pass-through feature revealing a server faceplate function masked when the dongle is coupled with the server type information handling system.

6. A system comprising:
   a processor;
   a data bus coupled to the processor; and,
   a front port dongle component, the front port dongle component comprising
     a housing, the housing including an insertion portion and a front portion, the insertion portion being configured to removably fit within a void defined by the server type information handling system, the front portion being configured to protrude beyond a front bezel of the server type information handling system;
     a server side connector, the server side connector interfacing with at least one of a plurality of connection features; and,
     a plurality of connectors mounted on a front face of the front portion of the housing, the plurality of connectors being coupled to the server side connector and providing separate connections for at least two functions from the at least one of the plurality of connection features; and wherein
   the server type information handling system comprises a rack server type information handling system;
   the rack server type information handling system comprises a mounting wing; and,
   the front portion of the housing covers the mounting wing when the front port dongle component is mounted within the void.

7. The system of claim 6, wherein:
   the housing is L-shaped.

8. The system of claim 6, wherein:
   the plurality of connection features comprise one or both of a high speed bus connection and a proprietary pinned connection.

9. The system of claim 6, wherein:
   the plurality of connectors include at least two of a serial port connector, a local area network connector, a video connector and a universal serial bus connector.

10. The system of claim 6, wherein the front port dongle component further comprises:

a pass-through feature, the pass-through feature revealing a server faceplate function masked when the dongle is coupled with the server type information handling system.

* * * * *